United States Patent Office 3,356,321
Patented Dec. 5, 1967

3,356,321
DE-ICING APPARATUS
Barry Rogal and Patrick Rees, Bognor Regis, England, assignors to Rosemount Engineering Company Limited, a British company
Filed Oct. 21, 1965, Ser. No. 499,807
Claims priority, application Great Britain, Nov. 10, 1964, 45,814/64
15 Claims. (Cl. 244—134)

ABSTRACT OF THE DISCLOSURE

For de-icing the leading edge of an aerodynamic structure using periodic electric heating, the leading edge portion has a leading surface of circular section over an arc of at least 90° from the chord line or medium line leading into a concave surface, said line passing through the leading edge. The ice mass, on heating of the leading surface of the structure can rotate about the circular arc and is then shed because of the concave surface forming a waist behind the leading edge. The leading surface is conveniently formed by or around an electric heater element extending along the leading edge of the structure.

---

Figure 1:
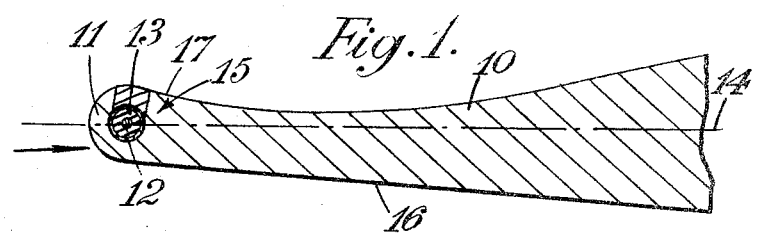

The invention relates to de-icing apparatus for use on aerodynamic structures. Such apparatus may be used on aircraft and also on other fast moving objects such as for example, fast moving ground or ship-borne radar antennae.

In one type of apparatus, a surface liable to become iced is continuously heated so that no ice may form on the surface. In an aircraft, such heating is supplied either electrically or by diverting hot air from the engines and is very expensive. A second type of apparatus which is less expensive to use allows ice to form for a short period, said 60 to 90 seconds, and then heats the surface for a shorter period of a few seconds so that the layer of ice immediately in contact with the surface is melted. When the heating is by electricity the load may be kept roughly constant by energising heaters at different locations in turn. On an aircraft, when the layer adjacent the heated surface is melted, the whole of the ice accretion sloughs away from the surface on the water film assisted by the air stream. In this second type of apparatus, it is important that the ice accretion does not merely slide on the surface to freeze on to an unheated portion and also that, in sloughing away, the ice accretion does not cause damage to apparatus in its path. In order to ensure that ice shed from the surface does not form blocks large enough to cause such damage, it is essential that all ice formed is shed at each heating cycle.

According to one aspect of this invention, de-icing apparatus for use on an aerodynamic structure comprises a member having a surface arranged to be the leading surface of the member, and heating means for heating said surface, the member having a portion adjacent the leading surface whose width decreases in the direction leading away from the leading surface. This member may be a part of the aerodynamic structure or its equipment or may be a separate member attached to the front of the particular part of the aircraft structure or equipment on which the ice is to be periodically removed. With this construction, when the surface of the ice melts and a portion starts to break away and slide back, it will be shed after passing the thickest region of the leading surface, that is when it reaches the portion where the width begins to decrease. As soon as it has parted contact with any part of the structure, it is rapidly carried away by the air stream.

The invention also includes within its scope the combination of a member having a leading surface and a portion adjacent but rearwardly of the leading surface of gradually decreasing width and, further rearwardly, of increasing width to have a maximum thickness substantially greater than that of said leading surface, and heating means for heating at least part of said leading surface in front of the portion of decreasing width.

The said portion may have a concave surface on one or both sides of the chord line of the member. The ice from this member will be shed more readily around the concave surface and, by providing a concave surface on one side only of the member, one can ensure that the bulk of the ice is discharged on that side of the member. The member may be arranged so that the chord line is inclined at an angle, preferably between one half degree and two degrees, to the air flow towards the leading edge. It will be understood that, for an aircraft, the direction of the air flow to be considered would be that during normal flight.

The invention furthermore includes within its scope the combination of a member having a leading surface, the profile of which leading surface is a circular arc extending over an angle greater than 90° on one side of the chord line of the member to merge into a concave surface of the member, whereby on at least that side of the chord line, the distance from one external surface of the member to the chord line measured in a direction normal to the chord line decreases and subsequently increases considering successive sections rearwardly of the leading surface, and electric heating means for heating said leading surface.

The member may comprise a cylindrical leading surface of radius less than 0.06 inch; by arranging the cylindrical surface to include an angle greater than 90° on one or both sides of the chord line, the rear portion of the cylindrical surface forms the surface of the portion of decreasing width.

The heating means may be arranged to heat the leading surface asymmetrically about the chord line, for example by arranging the heating means asymmetrically about the chord line.

Examples of the invention are illustrated in the accompanying drawings, in which FIGURES 1 to 4 are each a diagrammatic cross-section of part of an aircraft structure.

In FIGURE 1, part of a member 10 is shown in transverse cross-section. The member 10 might be for example the air intake to an engine or a strut supporting an instrument. It is required to prevent ice forming on the member. As shown in the drawing, the member 10 has a leading surface 11 in the form of an arc of a circle whose radius in this particular embodiment is 0.045 inch. An electric heating element comprising a wire 12 surrounded by insulation 13 is located within the arc. On one side of the chord line 14 the portion 15 of the member 10 behind the leading surface has a surface 16 tapering uniformly away from the chord line 14. On the other side of the chord line, the portion 15 of the member 10 has a concave surface 17 whose depth is 0.0035 inch in a chord length of about one inch. The portion 15 has a decreasing width immediately behind the leading surface 11. When ice touching the leading surface 11 is melted, the concave surface 17 tends to cause the ice accretion above the melted layer to be shed completely from that surface 17 without re-freezing on the member 10.

When only one side of the member 10 has the concave surface 17 (as shown in FIGURE 1), the ice accretion tends to be shed from the member on that side. By arranging the member 10 so that the damageable components are on the other side of the member, the chance of damage by ice being shed is reduced. In the particular example illustrated in FIGURE 1, the heating wire 12 is inserted by milling a narrow slot along the length of the member 10, inserting the wire and sealing it in position. Preferably a sleeved heater wire with a metal sleeve is used, the sleeve being sealed in good thermal contact with the member 10.

The preferential shedding of ice to one side of the member 10 is aided when the member is arranged so that its chord line is inclined to the normal air flow at about one degree, the air flow striking the member 10 on the side opposite the surface 17; the direction of this air flow is indicated by the arrow A. We have found that without the concave surface 17, the chord line 14 must be inclined at about 10° to the normal air flow to ensure shedding of the ice preferentially to one side.

Figure 2:
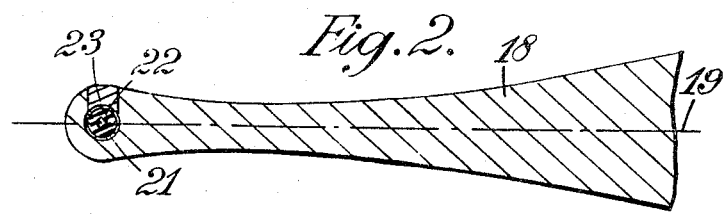

In FIGURE 2, there is shown a member 18 which in this case is symmetrical about a chord line 19. The member 18 has a concave surface 20 similar to the surface 17, of the member 10 of FIGURE 1 but on both sides of the chord line 19. The heating element 21 is located within the arc of the leading surface. In this particular embodiment, the heating element is symmetrically located so that the ice is shed equally on the two sides. The heating wire in this particular embodiment has been inserted in a slot through the member 18. Conveniently for this purpose a sleeved heater wire is employed, the heater element 21, surrounded by insulator 22 within a metal sleeve 23 being arranged in the slot with the sleeve in good thermal contact with the member 18.

Figure 3:
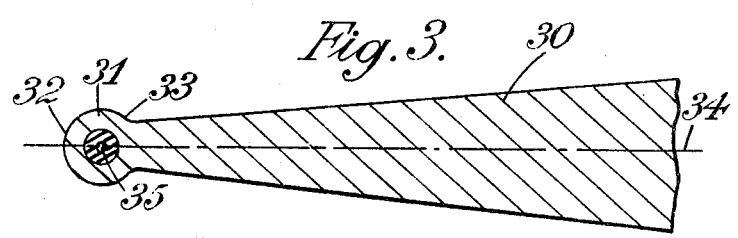

The member 30 of FIGURE 3 has a cylindrical surface 31 including an angle of about 280°. This arrangement is suitable when large ice accretions are likely. The front portion 32 of the surface forms the leading surface and the rear portion 33 of the cylinder forms the portion of decreasing width. Behind the portion 33, the member 10 tapers uniformly away from the chord line 34 symmetrically on both sides. An electric heating element 35 is located within the cylindrical surface. In this particular construction, it may be convenient to use a sleeved heater wire to form the whole of the cylindrical portion 31, the outer metal sleeve being brazed or welded to the main portion of the member 30.

Figure 4:
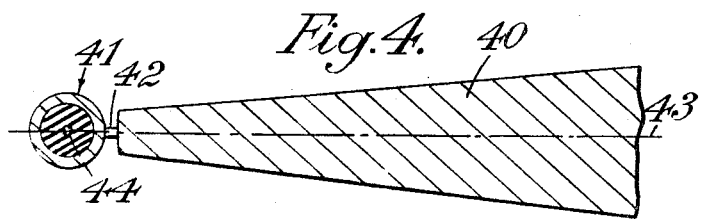

The member 40 of FIGURE 4 has a cylindrical rod 41 along its leading edge, mounted on spacers 42 on the remainder of the strut which tapers uniformly away from the chord line 43 similarly to that shown in FIGURE 3. The heating element 44 is located within the rod 41. Conveniently the rod 41 is a sleeved heater wire having an outer metal sleeve.

It will be noted that, on each of FIGURES 1 to 4, a leading surface of part cylindrical form is employed. As will be seen from the typical dimensions given above, the leading surface is of very small thickness compared with the main part of any member on an aircraft which has to be de-iced. However, by providing this heated leading surface, together with the thinner section portion immediately rearwardly of it, the ice is completely shed and does not adhere to the main part of the member 10 or 18 or 30 or 40, which is of substantially greater thickness than the heated leading edge.

The symmetrical exterior arrangements of FIGURES 2 to 4 may be arranged to shed ice preferentially to one side by heating the leading surface asymmetrically about the chord line. When the ice melts on one side of the member, the air flow exerts a couple on the remaining ice urging the ice to shed on the opposite side of the member from where the ice first melted. The heating element itself may be located asymmetrically about the chord line, or alternatively the member or a part thereof may be formed of materials of differing thermal conductivities so that the heat may be directed to the leading surface asymmetrically about the chord line. By directing the heat almost entirely towards the front of the leading edge in this way, either asymmetrically or symmetrically, the ice remains attached at the sides of the member until the ice at the front is turned to steam. The steam can be arranged to split the ice block from the member.

The engines and other apparatus susceptible to damage by shed ice are located on the side of the member remote from the side to which the ice is preferentially shed. The invention however is generally applicable to the de-icing of the leading edges of any suitable member on an aircraft and might be applied to a fin or a wing; in such cases, it may be preferred that the ice is shed on both sides.

In order to fit within such sharp leading edges, the heating elements must be small. Elements such as those described in British patent specifications Nos. 1,031,863 and 1,058,496 are suitable.

The heating element described in British patent specification No. 1,031,863 has at least two wires of differing conductivity joined end to end, sheathed in an insulating sleeve and contained within a continuous metal outer tube drawn down on to the wires and sleeve. The majority of the heat is obtained from the length of the element containing the wire of greater resistivity; the lower conductivity portions from low resistance connections to the heating element.

The element described in British patent specification No. 1,058,496 has a single continuous electrically conducting wire with an electrically conducting tube drawn on to a portion or portions of the wire, and sheathed in an insulating sleeve and contained within a continuous metal outer tube drawn down on to the wire, inner tube and sleeve. The majority of the heat is obtained from the length of the wire not encircled by the inner conducting tube.

We claim:
1. In an aerodynamic structure, the combination of a member having a leading surface, the profile of which leading surface is a circular arc extending over an angle greater than 90° on one side of a plane through the leading edge of the member and which, to the rear of the leading edge lies within the structure to merge into a concave surface of the member, whereby on at least that side of said plane, the distance from one external surface of the member to said plane, measured in a direction normal to said plane decreases and subsequently increases considering successive sections rearwardly of the leading surface, and electrical heating means for heating said leading surface.

2. The combination as claimed in claim 1, wherein said leading surface, in section, is a circular arc with a radius less than 0.06 inch.

3. The combination as claimed in claim 1, wherein the heating means are arranged to heat the leading surface asymmetrically about said plane.

4. The combination as claimed in claim 1, wherein the heating means comprises an electrical resistance wire within but insulated from a metal sleeve.

5. The combination as claimed in claim 1, wherein the heating means comprises an electrical resistance wire extending along the axis of said circular arc surface.

6. For electrically powered pulsed de-icing of an aerodynamic structure, the combination of a member having a leading surface the profile of which is a circular arc extending over at least 90° from a plane which plane passes through the leading edge and lies within the structure to the rear of the leading edge, said structure having a concave surface into which said circular arc merges such that the distance of the surface of the structure from said plane decreases and subsequently increases considering successive sections rearwardly of said circular arc and electrical heating means located within said structure and extending along said leading surface in the region bounded by said circular arc.

7. The combination as claimed in claim 6 wherein the heating means comprises a sleeved heating wire extending along the axis of said circular arc.

8. The combination as claimed in claim 6 wherein said structure has a concave surface on both sides of said plane, said circular arc extending over at least 180° to merge into both concave surfaces.

9. For electrically powered pulsed de-icing of an aerodynamic structure, the combination of a member having a leading edge in the form of at least a partial circular cylindrical surface, said member being symmetrical about a plane extending rearwardly from said leading edge through the axis of said cylindrical surface, said member having a concave surface on each side of said plane to the rear of said cylindrical surface, said cylindrical surface merging smoothly into said concave surfaces, the concave surfaces each having at least a portion spaced from said plane less than the radius of said cylindrical surface and heating means located in said member and extending along the length thereof in the region bounded by said cylindrical surface.

10. For electrically powered pulsed de-icing of an aerodynamic structure having a leading edge portion, the combination of a cylindrical member containing an electric heater element, and spacers mounted on the leading edge portion of the structure to carry said cylindrical member forwardly of the leading edge of said structure and parallel thereto, the spacers having a thickness transversely to the direction of the leading edge less than the diameter of said cylindrical member.

11. In an aerodynamic structure, a member that in transverse cross section includes a leading edge portion having a leading edge, said leading edge portion having a leading surface, and a second portion joined to said leading edge portion to extend rearwardly thereof, said second portion having a first surface and a second surface opposite said first surface, said leading surface in profile having a surface portion of a circular arc extending over at least 90° from a plane that passes through the leading edge and lies within the second portion, said first surface at a location adjacent said leading edge portion being more closely adjacent said plane than at a location more remote from said leading edge portion, and said first surface at the first mentioned location being more closely adjacent said plane than the circular arc surface portion at a location that is the most remote from said plane, and heater means in the leading edge portion for melting ice that has accumulated on the circular arc surface portion.

12. The structure of claim 11 further characterized in that said first and second surfaces are symmetrical about said plane and that the distance of each of said first and second surfaces from said plane progressively increase in successive sections rearwardly of a location spaced from and rearwardly of said leading edge portion.

13. The structure of claim 12 further characterized in that said first and second surfaces are continuously uniformly tapered away from said plane from said leading surface in a rearward direction and form continuous extensions of said leading surface.

14. The structure of claim 12 further characterized in that there is provided a spacer to join said leading edge portion to said second portion, said spacer being located between said leading edge portion and said second portion, and that said leading edge portion comprises a cylindrical rod.

15. In an aerodynamic structure, a member that includes a leading edge portion and a second portion joined to said leading edge portion to extend rearwardly thereof, and heater means in the leading edge portion, said member in transverse cross section having a leading surface on the leading edge portion, a first surface on the second portion, a second surface on the second portion that is opposite said first surface, said leading surface being curved to have the distances thereof normal to a straight line that passes the forwardmost location of the leading surface and is between said first and second surfaces increase in succession in a rearward direction, and a third surface on the leading edge portion rearwardly of the curved leading surface that forms a smooth continuation of the leading surface on the same side of said line, said third surface in a rearward direction approaching said line, said first surface at a first location being more closely adjacent said line than the most remote location of the curved surface that is on the same side of said line, and at a location rearwardly of said line and on the same side of said line being more remote from said line than at said first location, said heater means being provided at a location to melt accumulated ice on the curved leading surface so that the surface of the ice in contact with the leading edge portion will melt and thereafter ice will be shed from said member along the first surface side of said member.

References Cited

UNITED STATES PATENTS

| | | | |
|---|---|---|---|
| 2,136,532 | 11/1938 | West | 343—104 |
| 2,674,420 | 4/1954 | Johnson | 244—134 X |
| 2,742,248 | 4/1956 | Le Compte et al. | 244—134 |
| 3,128,964 | 4/1964 | Le Bel | 244—117 X |

MILTON BUCHLER, *Primary Examiner.*

B. BELKIN, *Assistant Examiner.*